(12) United States Patent
Faye et al.

(10) Patent No.: US 10,421,371 B2
(45) Date of Patent: Sep. 24, 2019

(54) SYSTEM FOR CHARGING AN ELECTRIC VEHICLE, ELECTRIC VEHICLE AND METHOD

(71) Applicant: Robert Bosch GmbH, Stuttgart (DE)

(72) Inventors: Ian Faye, Stuttgart (DE); Bernd Eckert, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 14/917,180

(22) PCT Filed: Jul. 3, 2014

(86) PCT No.: PCT/EP2014/064228
§ 371 (c)(1),
(2) Date: Mar. 7, 2016

(87) PCT Pub. No.: WO2015/032523
PCT Pub. Date: Mar. 12, 2015

(65) Prior Publication Data
US 2016/0200208 A1    Jul. 14, 2016

(30) Foreign Application Priority Data

Sep. 5, 2013    (DE) .................. 10 2013 217 740

(51) Int. Cl.
*B60L 53/63* (2019.01)
*B60L 53/14* (2019.01)
(Continued)

(52) U.S. Cl.
CPC ............... *B60L 53/63* (2019.02); *B60L 53/14* (2019.02); *B60L 53/30* (2019.02); *B60L 53/68* (2019.02);
(Continued)

(58) Field of Classification Search
USPC ......................................................... 320/109
See application file for complete search history.

(56) References Cited

U.S. PATENT DOCUMENTS

| 2011/0010043 A1* | 1/2011 | Lafky ................... | B60L 53/305 701/31.4 |
| 2011/0202418 A1* | 8/2011 | Kempton ............ | B60L 11/1824 705/26.1 |
| 2014/0021917 A1* | 1/2014 | Paupert ............... | B60L 11/1818 320/109 |

FOREIGN PATENT DOCUMENTS

| DE | 102009060364 | 6/2011 |
| DE | 202011103003 | 10/2012 |

(Continued)

OTHER PUBLICATIONS

International Search Report for Application No. PCT/EP2014/064228 dated Jan. 28, 2015 (English Translation, 3 pages).

*Primary Examiner* — Eric D Lee
(74) *Attorney, Agent, or Firm* — Michael Best & Friedrich LLP

(57) ABSTRACT

The invention relates to a system for charging an electric vehicle, comprising a measuring device which is designed to measure a charge voltage on a charging interface of the electric vehicle, an evaluation device which is designed to determine first characteristic variables from the measured charge voltage, a communication device which is designed to transfer the first characteristic variables to other electric vehicles and/or to capture, from the other electric vehicles, second characteristic variables relating to charge voltages of the other electric vehicles, a control device which is designed to control, in accordance with the first and/or second characteristic variables, the charge power withdrawn from an energy supply network by the electric vehicle by (Continued)

means of the charging interface. The invention also relates to an electric vehicle and a method.

17 Claims, 5 Drawing Sheets

(51) Int. Cl.
  *B60L 53/30* (2019.01)
  *B60L 53/68* (2019.01)
  *H02J 3/14* (2006.01)
  *H02J 13/00* (2006.01)
(52) U.S. Cl.
  CPC ............ *B60L 2240/70* (2013.01); *H02J 3/14* (2013.01); *H02J 13/0075* (2013.01); *Y02B 90/2653* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 10/126* (2013.01); *Y04S 30/12* (2013.01); *Y04S 40/126* (2013.01)

(56) References Cited

FOREIGN PATENT DOCUMENTS

| | | |
|---|---|---|
| JP | 2011193701 | 9/2011 |
| JP | 2012005227 | 1/2012 |
| JP | 2014017891 | 1/2014 |
| WO | 2012000538 | 1/2012 |
| WO | 2012042134 | 4/2012 |
| WO | 2012149965 | 11/2012 |
| WO | 2013111127 | 8/2013 |

\* cited by examiner

SYSTEM FOR CHARGING AN ELECTRIC VEHICLE, ELECTRIC VEHICLE AND METHOD

BACKGROUND OF THE INVENTION

The present invention relates to a system for charging an electric vehicle, a corresponding electric vehicle and a method for charging an electric vehicle.

For reasons of environmental protection as well as cost, options are being sought today to reduce the fuel consumption and thus the pollutant emissions of vehicles.

On option for reducing the fuel consumption of a vehicle is the use of a hybrid drive or an electric drive. Such vehicles can, for example, be charged at an electric outlet prior to a trip and be driven by an electric drive until the electrical energy store is empty.

In order to charge the energy store of such vehicles, charging stations are usually used today, which, e.g., can be installed in a house or the garage of an owner of the vehicle. Such charging stations can, however, also be set up at locations that are accessible to the public, e.g., parking lots. A vehicle owner can thus charge the energy store of his/her vehicle while he/she is shopping or at work. The energy store can thereby be charged via a charging cable with AC or DC current or, e.g., in a contactless manner by means of inductive energy transmission. A charging output of 3.5 kW is typically available.

The German patent application DE 20 2011 103 003 U1 demonstrates, for example, a possible form of a charging station for conductive AC current charging with the aid of a charging cable.

When charging such a vehicle, the vehicle is typically only charged via an individual phase of the energy supply network which is configured as a three-phase supply.

In unfamiliar areas, it is not always easy for owners to find a suitable charging station for their vehicle. In order to simplify the search for a charging station, so-called electric mobility service providers, also referred to simply as "providers", can assist the driver of the respective vehicle in finding an open charging station. The providers can also, in certain circumstances for a fee, reserve a charging station for the owner of the vehicle.

When looking for a charging station, the provider can, e.g., provide an application that is operated on a smartphone of the driver or on an infotainment system of the vehicle. The application can, e.g., via a telematics system of the vehicle, e.g. a GPS receiver, detect the position of the vehicle and lead the driver to the charging station.

The network level 7 of the energy supply network is usually designed as a three-phase system (e.g. 230/400 V). If a multiplicity of charging stations are now coupled to this three-phase system, the single-phase charging stations are on a statistical average usually evenly distributed over the three phases.

It can however not be excluded that a multiplicity of vehicles in a network of the network level 7 is connected to precisely those charging stations which are connected to the same phase of the three-phase supply network.

This leads to an asymmetrical load on the supply network which can lead to a breakdown of the network of the network level 7 or of the low-voltage transformer of the network level 6.

At a charging station, the driver of a vehicle is not able to recognize to what extent a load is already applied to that phase to which his/her vehicle is coupled by means of the respective charging station.

SUMMARY OF THE INVENTION

The invention accordingly relates to:

a system for charging an electric vehicle, comprising a measuring device which is designed to measure a charge voltage on a charging interface of the electric vehicle, an evaluation device which is designed to determine first characteristic variables from the measured charge voltage, a communication device which is designed to transfer the first characteristic variables to other electric vehicles and/or to capture, from the other electric vehicles, second characteristic variables relating to charge voltages of the other electric vehicles, a control device which is designed to control, in accordance with the first and/or second characteristic variables, the charge power withdrawn from an energy supply network by the electric vehicle by means of the charging interface.

The invention also relates to:

an electric vehicle comprising a charging interface and a charging device for an electric vehicle, said charging device having a system according to the invention.

The invention finally relates to:

a method for charging an electric vehicle, comprising the following steps: measuring a charge voltage on a charging interface of the electric vehicle, determining first characteristic variables from the measured charge voltage, transferring the first characteristic values to other electric vehicles and/or capturing, from the other electric vehicles, second characteristic variables relating to charge voltages of the other electric vehicles, controlling, in accordance with the first and/or second characteristic values, the charge power withdrawn from an energy supply network by the electric vehicle by means of the charging interface.

The insight underlying the present invention is that the driver of an electric vehicle cannot himself/herself provide for a reduction of the network load or, respectively, for a balancing of the network load if he/she is charging his/her electric vehicle at a charging station.

The concept underlying the present invention consists of taking this insight into account and of providing an option for automatically reducing the load on a phase of the energy supply network if said phase is overloaded as a result of charging a multiplicity of electric vehicles.

To this end, provision is made in the present invention for electric vehicles to have a system for charging the respective vehicle at their disposal which enables the charging process to be coordinated between the individual electric vehicles.

To this end, provision is made in the present invention for first characteristic variables of a charge voltage to be determined in an electric vehicle. Said first characteristic variables are then communicated to other electric vehicles. Second characteristic values are likewise captured from the other electric vehicles.

Finally, provision is made in the present invention for the charge power, which the electric vehicle withdraws from the energy supply network by means of a charging interface, to be controlled in accordance with the first characteristic variables and the second characteristic variables.

The present invention therefore ensures that a multiplicity of electric vehicles can be simultaneously charged in a three-phase supply network of the network level 7 without an overload of the three-phase supply network occurring. In particular, an intervention of a user or operating personnel of the charging station is not required here.

Advantageous embodiments of and modifications to the invention ensue from the claims as well as the description with reference to the figures in the drawings.

In one embodiment, the first and/or the second characteristic variables comprise at least the phase position of the charge voltage. This allows for a simple comparison of the charge voltages of the electric vehicle and the other electric vehicles.

In one embodiment, the control device is designed to determine on the basis of the phase position whether the electric vehicle and at least one of the other vehicles are coupled to the same electrical phase of the energy supply network. Because three phases having a phase angle of 0°, 120° and 240° are usually present in energy supply networks, this can be very easily determined by a simple comparison of the phasing, possibly with inclusion of a tolerance range.

In one embodiment, the control device is designed to control the charge power withdrawn from an energy supply network in accordance with the number of the other electric vehicles coupled to the same phase of the energy supply network. An overload of the respective phase of the energy supply network can thus be very easily prevented.

In one embodiment, the first and/or second characteristic variables have the value of the charge voltage. This enables a very easy determination of the load on the energy supply network because the nominal voltage thereof or, respectively, the nominal amount of the network voltage is known.

In one embodiment, the control device is designed to control the charge power withdrawn from the energy supply network in accordance with the amount of the charge voltage. If the charge voltage drops, e.g. from the nominal amount below a predefined threshold value, it can be assumed that the energy supply network is being operated at the limit of the load capacity thereof. The evaluation of the amount of the charge voltage therefore constitutes a very simple option for recognizing an impending overload of the energy supply network.

In one embodiment, the communication device is designed as a wireless communication device. This enables a very flexible communication to be established between the electric vehicle and other electric vehicles.

In one embodiment, the communication device is designed to establish a local, ad hoc communication between the electric vehicle and other electric vehicles. As a result, other electric vehicles can be dynamically integrated into the communication if said vehicles enter, e.g., into a relevant spatial region or if said vehicles enter into the range of the wireless communication interface.

In one embodiment, the communication device is designed to establish a server-based communication between the electric vehicle and other electric vehicles. This makes a very simple organization of the communication possible because individual electric vehicles have to communicate only with the server.

In one embodiment, the communication device has a WLAN interface, a GSM interface, a UMTS interface, a DSRC (Dedicated Short Range Communication) interface or something similar. This enables the system to be flexibly adapted to different requirements.

In one embodiment, the communication device has a data interface, which is designed to couple the communication device to a communication interface of the electric vehicle, in particular a WLAN interface, a GSM interface, a UMTS interface, a DSRC (Dedicated Short Range Communication) interface or something similar. This makes it possible to use communication means which are already present in the electric vehicle. Hence, a redundancy can be avoided and therefore the complexity of the system can be reduced.

In one embodiment, the control device is designed to transfer a possible departure time of the electric vehicle and/or a cruising range required for the electric vehicle via the communication device to other electric vehicles and to capture possible departure times of the other electric vehicles and/or cruising ranges required for the other electric vehicles. As a result, it is possible to exchange information between the electric vehicles as to the amount of energy with which a vehicle would have to be recharged within a certain amount of time in order to fulfill the desires of the driver of the respective electric vehicle.

In one embodiment, the control device is designed to carry out a prioritization of the electric vehicles in accordance with the possible departure times of the electric vehicle and the other electric vehicles and/or in accordance with a cruising range required for the electric vehicle and the other electric vehicles, and to control the charge power withdrawn from the energy supply network in accordance with the prioritization. In this way, it can be ensured that the wishes of the drivers of the electric vehicles are optimally fulfilled and that the electric vehicle has been recharged with the predefined amount of electrical energy at the desired time.

In one embodiment, the control device is designed to determine a position of the electric vehicle and to exchange the first and/or second characteristic variables only with other electric vehicles which are located within a predefined radius around the electric vehicle. It is thus ensured that the control of the charge power is carried out only on the basis of data which comes from vehicles that are connected to the same network of the network level 7 of the respective energy supply network.

In one embodiment, the system has a position determination device, in particular a GPS system or something similar, in order to determine the position of the electric vehicle. This makes a very simple determination of the position of the electric vehicle possible.

In further embodiments, the position determination device is designed as a position determination device based on mobile communications. In further embodiments, a manual position input by the driver or a position transmission from the charging station to the electric vehicle can, e.g., be provided.

The aforementioned embodiments of and modifications to the invention can, where appropriate, be arbitrarily combined with one another. Further possible embodiments, modifications and implementations of the invention also do not explicitly comprise named combinations of features of the invention which are described above or below with reference to the exemplary embodiments. The person skilled in the art will also particularly add individual aspects as improvements or complements to the respective basic form of the present invention.

BRIEF DESCRIPTION OF THE DRAWINGS

The present invention is explained below in greater detail with the aid of the exemplary embodiments specified in the schematic figures of the drawings. In the drawings.

In all of the figures, identical or functionally identical elements and devices—provided nothing else is specified—are provided with the same reference signs.

DETAILED DESCRIPTION

Figure 1:
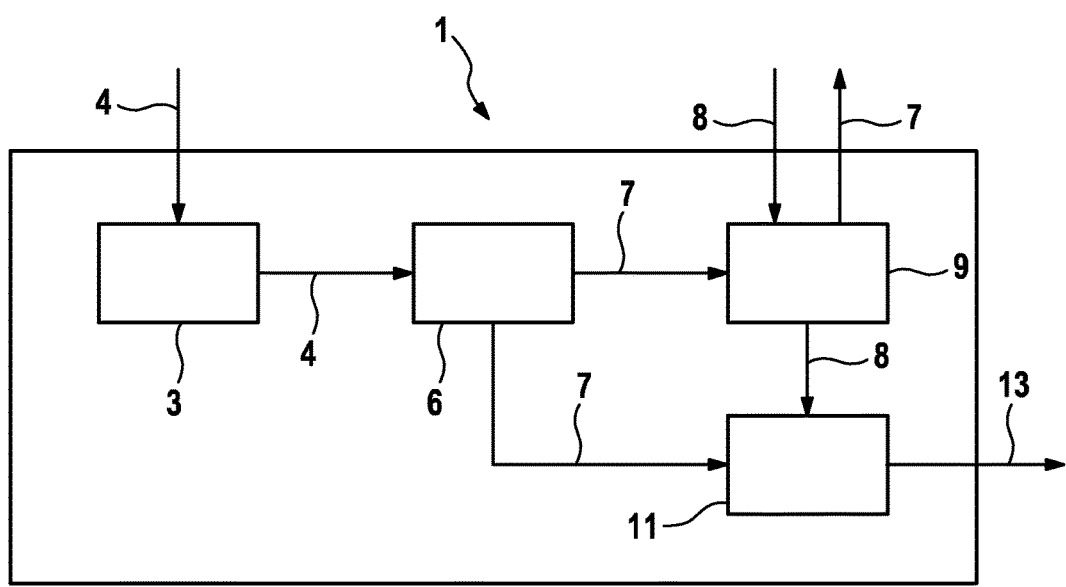
FIG. 1 shows a block diagram of an embodiment of a system according to the invention.

By the term electric vehicle, every vehicle is to be understood within the scope of this patent application which has an electric drive that drives the vehicle. In so doing, the vehicle can have only one or a plurality of electric motors or a combination of one or a plurality of electric motors and a further drive, e.g. an internal combustion engine.

Within the scope of this patent application, a measuring device is to be understood as every device which is designed to acquire the charge voltage on the charge interface. This can, e.g., be a simple resistor network or, respectively, a shunt resistor, which is connected to the control device. Other embodiments are also possible.

An evaluation device is to be understood as a device which can extract the characteristic variables from the acquired charge voltage. This can, e.g., take place by means of an analogous circuit. The characteristic variables can, however, also be calculated in the control device or in another computing device by means of a computer program.

The characteristic variables can represent a multiplicity of variables which can be derived from the charge voltage. The characteristic variables particularly comprise, e.g., the amount of charge voltage, the phase position of the charge voltage, the frequency of the charge voltage and the like.

Within the scope of the present patent application, the charge voltage refers to that AC voltage which the energy supply network provides to the electric vehicle via a charging station for charging the energy store.

A charging interface refers to an interface via which the electric vehicle can be coupled to the charging station. The charging station can, e.g., be a wired charging interface.

The phase position refers to the position of an electrical phase via which the charging interface is supplied with electrical energy. The phase position can be acquired with respect to a fixed reference point in time. In so doing, the reference point in time can, e.g., be obtained from a GPS signal. The phase position can, however, also be acquired with respect to a time base between the electric vehicles by means of the communication device.

An energy supply network refers to an electrical supply network, which is designed to transfer electrical energy from an energy producer, e.g. a power plant or a solar plant, to the charging station, by means of which the electric vehicle is charged, via a multiplicity of network levels, wherein typically 7 network levels are provided.

A local, ad hoc communication refers to a communication in which the participants in the communication organize themselves. That means that participants can dynamically leave the communication and new participants can enter into the communication at any time. The local, ad hoc communication can thereby provide that participants in the communication can only communicate directly with one another. Provision can, however, also be made for individual participants to be able to function as routers, which can transmit data from one communication participant to another communication participant. A vehicle which can communicate with other vehicles considers itself to be at the focal point and is thus limited in its communication by the limits of the communication means that are available.

A server-based communication refers to a communication in which each of the participants communicates with a central server or a multiplicity of servers, which transmit communication data between the communication participants.

FIG. 1 shows a block diagram of an embodiment of a system 1 according to the invention for charging an electric vehicle 2.

The system 1 in FIG. 1 comprises a measuring device 3, which is coupled to the evaluation device 6. The evaluation device 6 is coupled to the communication device 9 and to the control device 11.

The measuring device 3 measures the charge voltage 4 on a charging interface 5 of the electric vehicle 2 and transmits the measured charge voltage 4a to the evaluation device 6.

The evaluation device 6 determines first characteristic variables 7 from the measured charge voltage 4a and provides the same to the communication device 9 as well as to the control device 11.

The communication device 9 transfers the first characteristic values 7 to other electric vehicles 10-$n$ (10-1-10-12) and captures second characteristic variables 8 from these other electric vehicles, said communication device 9 then transferring said second characteristic variables to the control device 11.

The control unit 11 is designed to control a charge power 13 on the basis of the first and second characteristic variables 7 and 8. In so doing, the control device 11 can, e.g., transmit a control command or a performance value to a power electronics of the electric vehicle 2, said control command or performance value indicating the desired charge power 13. On the basis of the first characteristic variables 7 and the second characteristic variables 8, the control device 11 can calculate or, respectively, estimate how greatly the energy supply network 12 is loaded as a result of charging the electric vehicle 1 and the other electric vehicles 10-$n$ (10-1-10-12). If the control device 11 determines that the phase of the energy supply network 12 being used is already heavily loaded, said control device 11 can, e.g., provide a smaller power charge 13 than the power electronics of the electric vehicle 1 can maximally transmit or, respectively, the energy store (for example the battery) can accommodate.

By virtue of the fact that the electric vehicle 1 can communicate with the other electric vehicles 10-$n$ (10-1-10-12) without a driver of the electric vehicle 1 having to actively intervene in the charging process to accomplish this end, the process of the power adaptation can be automatically carried out by the control device 11.

Figure 2:
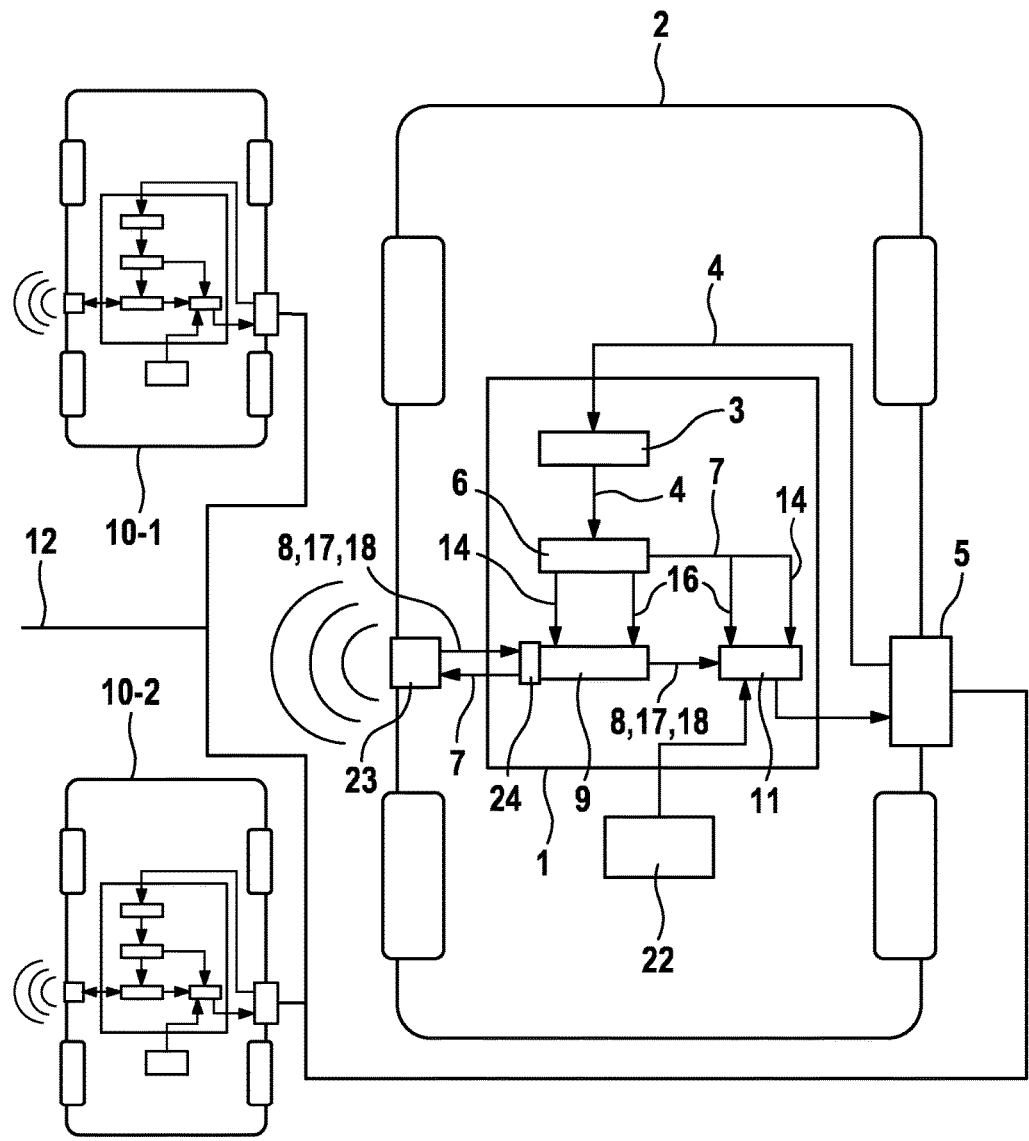
FIG. 2 shows a block diagram of an embodiment of an electric vehicle according to the invention.

FIG. 2 shows a block diagram of an embodiment of an electric vehicle 2 according to the invention.

In FIG. 2, two electric vehicles 10-1 and 10-2 are depicted in addition to the electric vehicle 2. Each of the electric vehicles 2, 10-1 and 10-2 comprise in this case an inventive system 1 for charging an electric vehicle, wherein reference signs are only provided in the electric vehicle 2 for the sake of clarity. The systems 1 of the other electric vehicles 10-1 and 10-2, which are only schematically depicted, are furthermore depicted in a simplified manner but are, however, equally important as the system 1 of the electric vehicle 2.

The three electric vehicles 2, 10-1 and 10-2 are each coupled via a charging interface 5 to the energy supply network 12. In particular, the electric vehicles 2, 10-1 and 10-2 can each be coupled via a charging station 21-1-21-20 to the energy supply network 12.

If the energy supply network 12 relates, e.g., to a three-phase network, which comprises three electrical phases 15-1-15-3, the electric vehicles 2, 10-1, 10-2 can, in accordance with the respective charging station 21-2-21-20, be coupled to one of the phases of the energy supply network 12. In so doing, it is possible for the electric vehicles 2, 10-1 and 10-2 to be coupled to the same electrical phase 15-1-15-3 and therefore to load the same electrical phase 15-1-15-3 if said vehicles are being charged.

The system 1 for charging an electric vehicle of FIG. 2 is based on the system 1 for charging an electric vehicle from FIG. 1 and differs from the same to the extent that the evaluation device 6 is designed to determine a phase position 14 and an amount 16 of the charge voltage 4 as the first characteristic variables 7. In addition, the communication device 9 comprises a data interface 24, which is coupled to a communication interface 23 of the electric vehicle 1. The control device 11 is furthermore coupled to a GPS receiver 22 of the electric vehicle 2.

Finally, the communication device 9 is designed to capture a possible departure time 17 and a cruising range 18 required for the respective electric vehicle 10-1, 10-2 and to transmit the same to the control device 11.

An input device, which is designed to query a destination and a possible departure time 17 for the next trip of the electric vehicle 2 from the driver of the electric vehicle 2 is not depicted in FIG. 2. From the destination, the control device 11 can calculate the distance and therefore the required cruising range 18 for the trip. If the required range 18 is known, the control device can also calculate the required minimum state of charge of the vehicle battery of the electric vehicle 2 and adapt the power charge 13 accordingly.

The control device 11 can detect the position of the electric vehicle 1 via the GPS receiver 22 and subsequently communicate only with other electric vehicles 10-1, 10-2 which are located within a certain radius 20 around the electric vehicle 2. It can thus be ensured that the adaptation of the power charge 13 is carried out on the basis of the second characteristic variables 8 which come from other electric vehicles 10-1, 10-2 that are coupled to the same energy supply network 12 as the electric vehicle 2.

If the energy supply network 12 relates to a three-phase network comprising three electrical phases 15-1-15-3, the control device 11 can determine on the basis of the phase position 14 of the charge voltage 4 of the electric vehicle 2 and on the basis of the phase position of the charge voltages 4 of the other electric vehicles 10-1, 10-2 whether said other electric vehicles can be supplied with electrical energy by means of the same electrical phase 15-1-15-3 as the electric vehicle 2.

The control device can furthermore determine on the basis of the amount of charge voltage 4 whether the energy supply network 12 is overloaded or is nearing overload. For example, a drop of the charge voltage 4 below the nominal amount of the voltage of the energy supply network 12 is an indication of an overload.

If information is now available as to how many electric vehicles 2, 10-1, 10-2 are coupled to the same electrical phase 15-1-15-3, the control devices 11 of the electric vehicles 2, 10-1, 10-2 can actively control the load distribution between the individual electric vehicles 2, 10-1, 10-2.

Each of the electric vehicles 2, 10-1, 10-2 can, for example, reduce the charge power. This can, however, also lead to the maximum possible power not being withdrawn from the energy supply network 12. It is therefore possible that only one or several of the electric vehicles 2, 10-1, 10-2 reduce the charge power 13.

If the drivers of at least one of the electric vehicles 2, 10-1, 10-2 have specified a possible departure time 17 and a required cruising range 18 for their respective next trip, the control devices 11 of the electric vehicles 2, 10-1, 10-2 can perform a prioritization of the charging process.

Thus, one of the electric vehicles 2, 10-1, 10-2, the driver of which wants to very quickly drive again with the respective electric vehicle 2, 10-1, 10-2, can, e.g., be regarded to have an urgent need for recharging and therefore receive a high priority for the charging process. A vehicle, the driver of which wants to travel a very long distance with the respective electric vehicle 2, 10-1, 10-2 likewise receives a high priority.

In one embodiment, the control device 11 can deposit data in a table with regard to every other electric vehicle 10-1, 10-2. In so doing, the data can comprise the distance to the respective other electric vehicle 10-1, 10-2, the urgency of the charging for the respective other electric vehicle 10-1, 10-2, the current charge power of the respective other electric vehicle 10-1, 10-2, the priority assigned to the other electric vehicle 10-1, 10-2 by the control device 11 and a time stamp which designates the time at which the data with regard to the respective electric vehicle 10-1, 10-2 were captured or, respectively, stored.

The table can, e.g., look as follows:

| ID | Distance in m | Urgency | Charge Power in kW | Priority | Time Stamp |
|---|---|---|---|---|---|
| 2 | 0 | 5 | 3.5 | 1 | 13:13:01 |
| 10-1 | 17 | 2 | 1 | 2 | 13:17:37 |
| 10-2 | 32 | 1 | 0.5 | 3 | 12:54:09 |

In the table depicted above, the control device 11 of the electric vehicle 2 has also deposited the data for the electric vehicle 2 itself. In addition, the data for the other electric vehicles 10-1, 10-2 are deposited. It can be seen from the table that the electric vehicle 2 has to very urgently be charged (Urgency: 5) and therefore receives the full charge power 13 of 3.5 kW. The other electric vehicle 10-1 is situated at a distance of 17 m to the electric vehicle 2 and less urgently requires a charge (Urgency: 2). As a result, said electric vehicle 10-1 receives only a smaller charge power 13 of 1 kW. Finally, the other electric vehicle 10-2 is situated at a distance of 32 m to the electric vehicle 1 and receives only 0.5 kW charge power 13 due to the low level of urgency of 1.

In one embodiment, the table can also comprise the first characteristic variables 7 and the second characteristic variables 8. In addition, the table can also contain entries for additional electric vehicles which do not lie within the communication range of the communication device 9. These data can, e.g., be obtained via the other electric vehicles 10-1, 10-2, which as routers forward said data.

Hence, an area in the neighborhood of the affected electric vehicles 2, 10-1, 10-2 can automatically be covered. In so doing, the area covered is bounded by the limits of the communication means being used (e.g. range). The area can thus be expanded until neighboring vehicles are located so far apart from one another that they can longer communicate with one another.

Figures 3, 4:
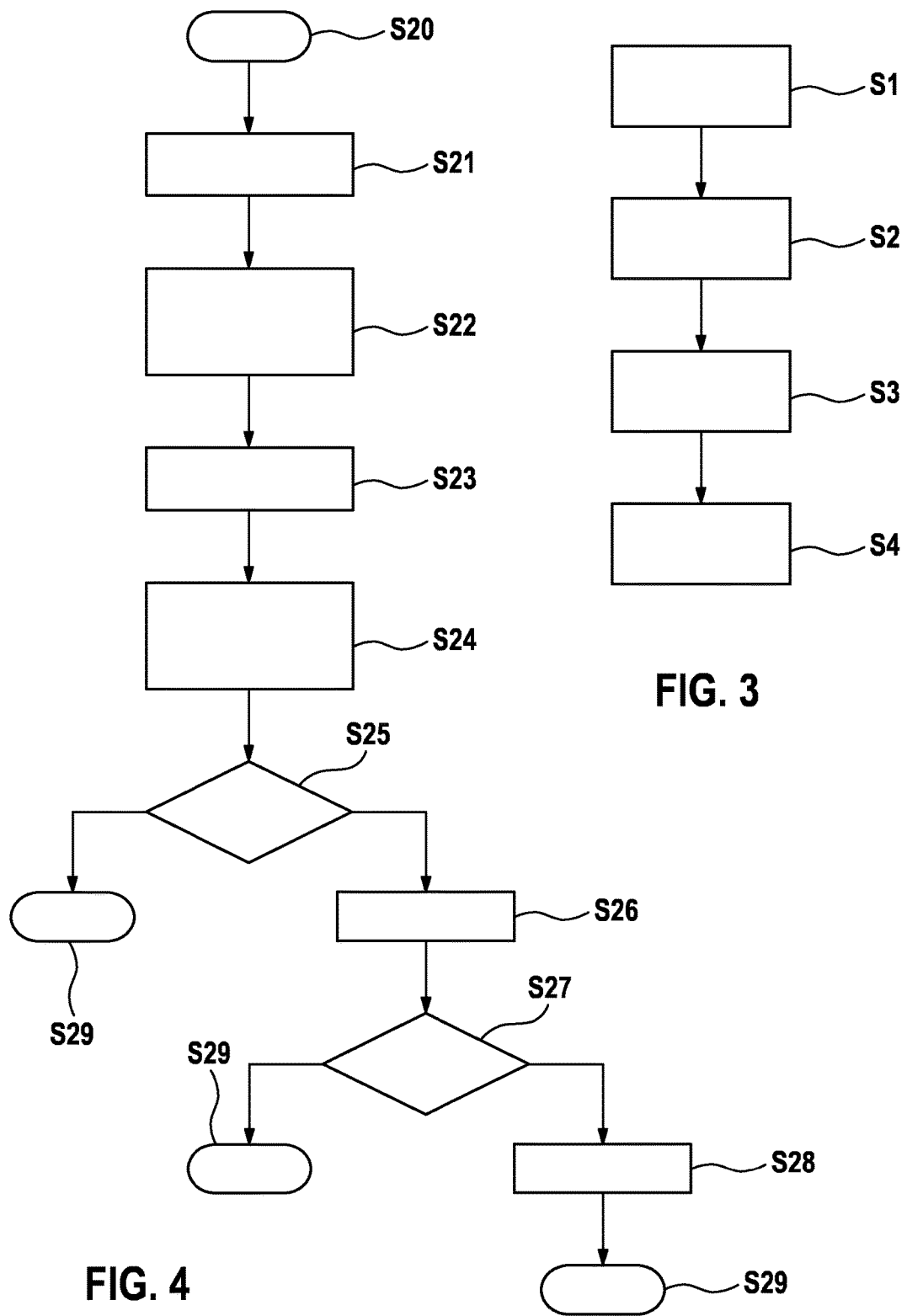
FIG. 3 shows a flow diagram of an embodiment of a method according to the invention.
FIG. 4 shows a further flow diagram of an embodiment of a method according to the invention.

FIG. 3 shows a flow diagram of an embodiment of a method according to the invention.

In a first step S1, the method makes provision for measuring a charge voltage on a charging interface 5 of the electric vehicle 2.

Provision is furthermore made in a second step S2 for first characteristic values 7 to be determined from the measured charge voltage 4.

In a third step S3, the first characteristic variables 7 are transferred to other electric vehicles 10-1-10-12. In the third step S3, second characteristic variables 8 relating to the charge voltages 4 of the other electric vehicles 10-$n$ (10-1-10-12) are additionally or alternatively captured from said other electric vehicles 10-$n$ (10-1-10-12).

Finally, provision is made in a fourth step S4 for the charge power 13 withdrawn from an energy supply network 12 by the electric vehicle 2 to be controlled in accordance with the first and/or the second characteristic variables 7, 8.

In one embodiment of the method, the first characteristic values 7 and the second characteristic values 8 can comprise the phase position 14 of the respective charge voltage 4 and the amount 16 of the respective charge voltage 4.

With the aid of the phase position 14, it can be determined whether the other electric vehicles 10-1, 10-2 can be charged via the same electrical phase 15-1-15-3 of the energy supply network 12. It can furthermore be determined by means of the amount 16 of the respective charge voltage 4 whether the energy supply network 12 is overloaded or is nearing overload. It was already described above how this process takes place. Reference is made here to the embodiments described above.

If other electric vehicles 10-1, 10-2 are supplied with electrical energy by means of the same electrical phase 15-1-15-3 and if the amount 16 of the charge voltage lies below a threshold value, the charge power 13 can be reduced in order to relieve the energy supply network 12.

Provision can be made in one embodiment of the method for information to only be exchanged with those other electric vehicles 10-1, 10-2 which are located within a certain radius 20 around the electric vehicle 1. Because the networks of the network level 7 each supply small spatial regions with electrical energy, it can thus be ensured that only other electric vehicles 10-1, 10-2 are taken into account which are connected to the same electrical phase 15-1-15-3 of the energy supply network 12 or the to the same network of the network level 7.

In order to determine the position of said other electric vehicles, a GPS receiver can be used.

In a further embodiment, provision is made in the method for a possible departure time 17 of the electric vehicle 2 or, respectively a cruising range 18 required for the electric vehicle 2 to be exchanged with the other electric vehicles 10-1-10-12. In so doing, the electric vehicles 2, 10-1, 10-2 can be prioritized in accordance with the possible departure times 17 of the electric vehicle 2 and the other electric vehicles 10-1-10-12 or, respectively, in accordance with a cruising range 18 required for the electric vehicle 2 and the other electric vehicles 10-1-10-12; and the charge power withdrawn from the energy supply network can be controlled as a function of the prioritization. As a result, highly prioritized electric vehicles 2, 10-1, 10-2 can be supplied with a higher charge power than low-priority electric vehicles 2, 10-1, 10-2.

Provision can particularly be made in one embodiment of the method for the communication with the other electric vehicles 10-1, 10-2 to be carried out via a local, self-organizing, ad hoc network.

In a further embodiment, the communication can also take place via a server.

FIG. 4 shows a further flow diagram of an embodiment of a method according to the invention.

In FIG. 4, the method begins with step S20. In step S21, the first characteristic variables 7 and the second characteristic variables 8 are exchanged with other electric vehicles 10-1, 10-2. The first and the second characteristic variables 7 and 8 can, e.g., comprise a phase position 14 and an amount 16 of the charge voltage 4 of the respective electric vehicle 10-1, 10-2. The phase position can, e.g., thereby be transmitted in the form of a point in time of the zero-crossing of the charge voltage. In addition, possible departure times 17 and required cruising ranges 18 can, e.g., also be exchanged between the electric vehicles 2, 10-1, 10-2. Further data can additionally be exchanged. Said further data can contain the GPS coordinates of the respective electric vehicle 2, 10-1, 10-2, a charging urgency, e.g. comprising values from 1 (less urgent) to 5 (very urgent), and a current charge power, e.g. in kW. Finally, a vehicle identification can, e.g., be transmitted. It can thus, e.g., be determined whether data of a third electric vehicle have been transmitted in a local, ad hoc network by means of an electric vehicle functioning as a router.

In step S22, the distances to the other electric vehicles 10-1, 10-2 are calculated and the points in time of the zero-crossings are compared in order to determine which electric vehicles 2, 10-1, 10-2 are coupled to the same electrical phase 15-1-15-3 of the energy supply network 12.

In step S23, the data relating to the individual electric vehicles 10-1, 10-2 are deposited in a table. In one embodiment, a second table is deposited which comprises data relating to the power output that the respective energy supply network 12 is capable of providing.

In step S24, it can then be ascertained how many electric vehicles 2, 10-1, 10-2 are connected to the same electrical phase. From the location of the electric vehicles 2, 10-1, 10-2 and the second table, the power output, which the respective electrical phase 15-1-15-3 can deliver, is determined.

In step S25, a check is made whether an overload of the network is impending. If this is not the case, the charging process is started in step S29. If, however, this is the case, the urgent needs are compared in step S26. If the driver's own vehicle 2, 10-1, 10-2 does not have the highest urgency, the charge power 13 thereof is reduced in step S27 and the charging process is started in step S29. If the driver's own vehicle 2, 10-1, 10-2 has, however, the highest urgency, the charging process is begun directly in step S29.

Figure 5:
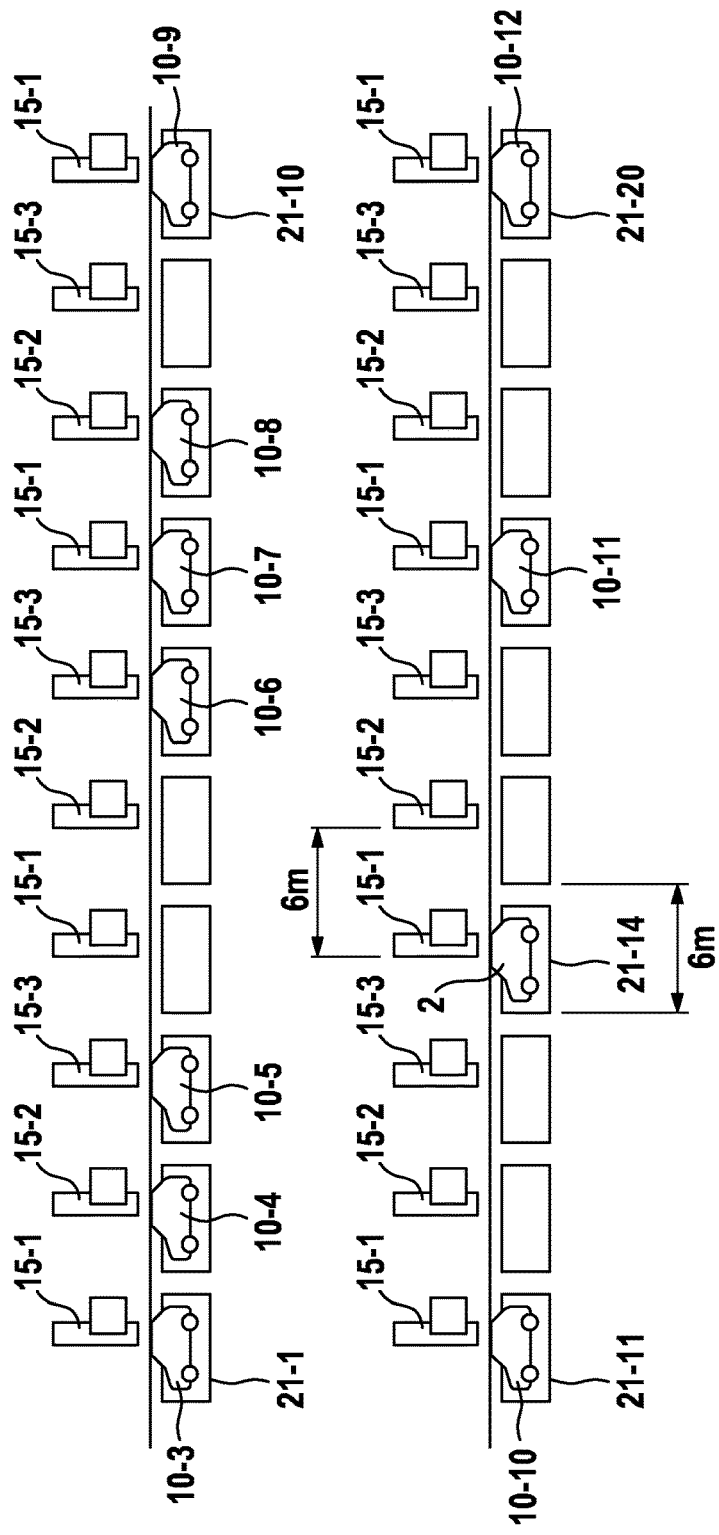
FIG. 5 shows a depiction of electric vehicles at charging stations.

FIG. 5 shows a depiction of electric vehicles 2, 10-3-10-12 at charging stations 21-1-21-20.

The charging stations are arranged in two rows each comprising 10 charging stations 21-1-21-10 and 21-11-21-20. For the sake of clarity, only the first and the last charging stations 21-1, 21-10, 21-11 and 21-20 as well as the charging station 21-14 are provided with reference signs. The charging stations 21-1-21-20 are each, beginning with the first electrical phase 51-1, coupled in sequence to the electrical phases 15-1, 15-2, 15-3.

Seven electric vehicles 10-3-10-9 are arranged in the first row. In so doing, one of the electric vehicles 10-3-10-9 is located respectively at the first, the second, the third, the sixth, the seventh, the eighth and the tenth charging station 20-1, 20-2, 20-3, 20-6, 20-7, 20-8 and 20-10.

As can be seen, the electric vehicles 10-3-10-9 are approximately evenly distributed with regard to the electrical phases 15-1, 15-2, 15-3. For that reason, none of the electrical phases 15-1, 15-2, 15-3 is loaded to a greater extent than the others.

In the second row, only four electric vehicles 10-10, 2, 10-11 and 10-12 are respectively arranged at the first, fourth, seventh and tenth charging station 21-11, 21-14, 21-17 and 21-20. It can be seen here that only one single electrical phase 15-1 is heavily loaded as is the case when the vehicles are distributed in an unfavorable manner.

Figure 6:
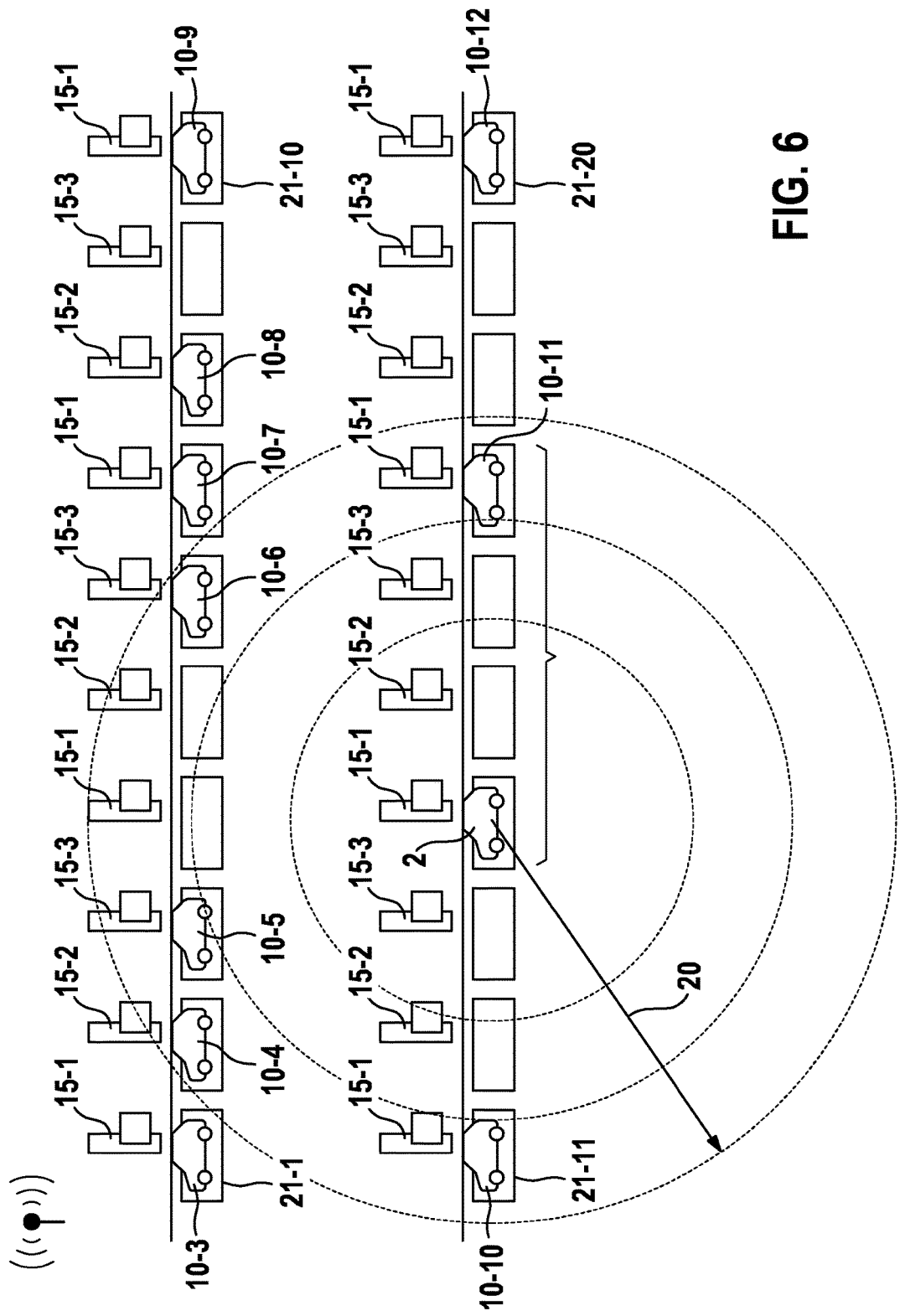
FIG. 6 shows a further depiction of electric vehicles at charging stations.

FIG. 6 shows a further depiction of electric vehicles at charging stations.

The depiction of FIG. 6 is based on the depiction of FIG. 5. In FIG. 6, the electric vehicle is however depicted as the center of a circle with the radius 20 which represents the communication range within which the electric vehicle 2 can exchange data with further electric vehicles 10-3-10-12. It can, for example, be seen that the other electric vehicle 10-11 is still located in the communication range of the electric vehicle 2. In order to communicate with the other electric vehicle 10-12, the electric vehicle 2 has to however use, e.g., the other electric vehicle 10-11 as a router.

It is thus possible that the electric vehicles 2, 10-3-10-12, as described above, coordinate with one another and reduce the load on the first electrical phase 15-1, so that an overload does not occur in the first electrical phase 15-1.

The invention claimed is:

1. A system for charging an electric vehicle, the system comprising;
   a measuring device which is designed to measure a charge voltage applied to a charging interface of the electric vehicle from an energy supply network coupled to the charging interface;
   an evaluation device which is designed to determine first characteristic variables from the measured charge voltage;
   a communication device configured to transfer the first characteristic variables to other electric vehicles and to capture, from the other electric vehicles, second characteristic variables relating to charge voltages of the other electric vehicles;
   a control device of the electric vehicle which is integrated into the electric vehicle and is configured to coordinate a charging process of the electric vehicle with the other electric vehicles, in accordance with the first characteristic variables and the second characteristic variables, by controlling charge power withdrawn from the energy supply network by the electric vehicle by means of the charging interface.

2. The system according to claim 1, wherein the first characteristic variables, the second characteristic variables, or both comprise at least the phase position of the charge voltage.

3. The system according to claim 2, wherein the control device is configured to determine on the basis of the phase position whether the electric vehicle and at least one of the other electric vehicles are coupled to the same electrical phase of the energy supply network.

4. The system according to claim 3, wherein the control device is designed to control the withdrawn charge power in accordance with the number of the other electric vehicles coupled to the same phase of the energy supply network.

5. The system according to claim 1, wherein the first characteristic variables, the second characteristic variables, or both comprise the amount of the charge voltage.

6. The system according to claim 5, wherein the control device is designed to control the withdrawn charge power in accordance with the amount of the charge voltage.

7. The system according to claim 1, wherein the communication device is configured as a wireless communication device; and/or in that the communication device is designed to establish a local, ad hoc communication between the electric vehicle and other electric vehicles; and/or in that the communication device is designed to establish a server-based communication between the electric vehicle and other electric vehicles.

8. The system according to claim 1, wherein the control device is configured to transmit a possible departure time of the electric vehicle, to transmit a cruising range required for the electric vehicle by means of the communication device to other electric vehicles and to capture via the communication device possible departure times of the other electric vehicles and/or cruising ranges required for the other electric vehicles; and in that control device is designed to carry out, in accordance with the possible departure times of the electric vehicle and the other electric vehicles and/or in accordance with a required cruising range for the electric vehicle and the other electric vehicles, a prioritization of the electric vehicles and to control the withdrawn charge power as a function of the prioritization.

9. The system according to claim 1, wherein the control device is configured to determine a position of the electric vehicle and to exchange the first characteristic variables, the second characteristic variables, or both via the communication device only with other electric vehicles which are located within a predetermined radius around the electric vehicle.

10. An electric vehicle comprising,
    a charging interface; and
    a charging device, which has a system according to claim 1.

11. The system according to claim 1, wherein the control device is further configured to determine how much the energy supply network is loaded as a result of charging the electric vehicle and the other electric vehicles based on the first characteristic variables and the second characteristic variables.

12. The system according to claim 1, wherein the control device is configured to coordinate the charging process of the electric vehicle with the other electric vehicles by determining a load on the energy supply network based on the first characteristic variables and the second characteristic variables and controlling the charge power withdrawn from the energy supply network by the electric vehicle to balance the determined load on the energy supply network.

13. A method for charging an electric vehicle comprising:
    measuring a charge voltage applied to a charging interface of the electric vehicle;
    determining first characteristic variables from the measured charge voltage;
    transferring the first characteristic variables to other electric vehicles;
    capturing, from the other electric vehicles, second characteristic variables relating to charge voltages of the other electric vehicles;
    controlling, with a control device integrated into the electric vehicle and configured to coordinate a charging process of the electric vehicle with the other electric vehicles, charge power withdrawn from an energy supply network by the electric vehicle in accordance with the first characteristic variables and the second characteristic variables by means of the charging interface.

14. The method according to claim 13,
    wherein the first characteristic variables, the second characteristic values variables, or both comprise at least the phase position of the charge voltage; and wherein it is determined when controlling on the basis of the phase position whether the electric vehicle and at least one of the other electric vehicles are coupled to the same electrical phase of the energy supply network; and the withdrawn charge power is controlled in accordance with the number of the other electric vehicles coupled to the same phase of the energy supply network.

15. The method according to claim 13,
wherein the first characteristic variables, the second characteristic variables, or both comprise the amount of the charge voltage; and
wherein the withdrawn charge power is controlled as a function of the amount of the charge voltage.

16. The method according to claim 13,
wherein a possible departure time of the electric vehicle, a cruising range required for the electric vehicle or both are transmitted via the communication device to other electric vehicles; and/or
wherein possible departure times of the other electric vehicles, cruising ranges required for the other electric vehicles, or both are captured; and
wherein the electric vehicles are prioritized in accordance with the possible departure times of the electric vehicle and the other electric vehicles and/or a required cruising range for the electric vehicle and the other electric vehicles, and the withdrawn charge power is controlled as a function of the prioritization.

17. The method according to claim 13, wherein a position of the electric vehicle is determined and the characteristic variables are exchanged only with other electric vehicles which are located within a predetermined radius around the electric vehicle.

* * * * *